(12) United States Patent
Varone (10) Patent No.: US 9,665,816 B1
(45) Date of Patent: May 30, 2017

(54) CIRCULAR MACHINE READABLE CODE AND METHODS FOR PRESENTING AND READING A CIRCULAR MACHINE READABLE CODE

(71) Applicant: STMicroelectronics, Inc., Coppell, TX (US)

(72) Inventor: Francesco Varone, Hillsborough, NJ (US)

(73) Assignee: STMicroelectronics, Inc., Coppell, TX (US)

( * ) Notice: Subject to any disclaimer, the term of this patent is extended or adjusted under 35 U.S.C. 154(b) by 0 days.

(21) Appl. No.: 15/075,416

(22) Filed: Mar. 21, 2016

(51) Int. Cl.
*G06K 7/10* (2006.01)
*G06K 19/04* (2006.01)
*G06K 19/06* (2006.01)

(52) U.S. Cl.
CPC ....... *G06K 19/041* (2013.01); *G06K 7/10792* (2013.01); *G06K 19/0614* (2013.01); *G06K 19/06103* (2013.01); *G06K 19/06131* (2013.01)

(58) Field of Classification Search
USPC ............... 235/462.03, 462.01, 462.09, 494
See application file for complete search history.

(56) References Cited

U.S. PATENT DOCUMENTS

| | | | |
|---|---|---|---|
| 5,554,841 A | 9/1996 | Kost et al. | |
| 5,798,514 A | 8/1998 | Domanik | |
| 5,861,613 A | 1/1999 | Apelberg et al. | |
| 6,802,454 B1 * | 10/2004 | McMurtry | G06K 19/06037 235/462.09 |
| 7,398,928 B2 * | 7/2008 | Gaspard | G01C 15/02 235/454 |
| 7,621,459 B2 | 11/2009 | Hovis | |
| 8,517,281 B2 * | 8/2013 | Rupp | A61J 1/00 235/375 |
| 9,104,933 B2 | 8/2015 | Venkatesha et al. | |
| 2003/0121979 A1 * | 7/2003 | D'Haens | G06K 19/06028 235/462.03 |
| 2007/0278316 A1 * | 12/2007 | Hovis | G06K 7/1421 235/494 |
| 2009/0090786 A1 | 4/2009 | Hovis | |
| 2010/0078480 A1 | 4/2010 | Aker | |
| 2013/0312619 A1 | 11/2013 | Spiegel et al. | |

* cited by examiner

*Primary Examiner* — Ahshik Kim
(74) *Attorney, Agent, or Firm* — Gardere Wynne Sewell LLP (57) ABSTRACT

A machine readable code is presented in the form of a graphic seal shape that includes a central region and numerous triangular shapes arranged in a sequence surrounding the central region. A vertex of each triangular shape extends radially outwardly from the central region. The triangular shapes include at least two visually distinct presentations for encoding information based on a pattern of the visually distinct presentations of the triangular shapes in the sequence.

50 Claims, 6 Drawing Sheets

CIRCULAR MACHINE READABLE CODE AND METHODS FOR PRESENTING AND READING A CIRCULAR MACHINE READABLE CODE

TECHNICAL FIELD

The present invention relates to machine readable codes and, in particular, to a circular machine readable code geometry and methods for presenting and reading such codes.

BACKGROUND

Bar codes are machine readable markings that encode and store data in a geometric pattern.

Figure 1:
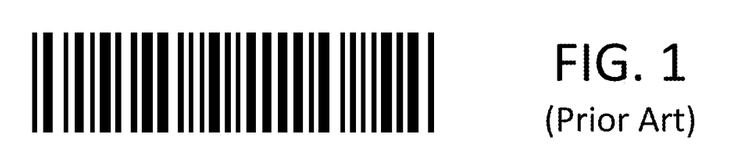
FIG. 1 illustrates an example of a one-dimensional bar code.
Figure 2A:
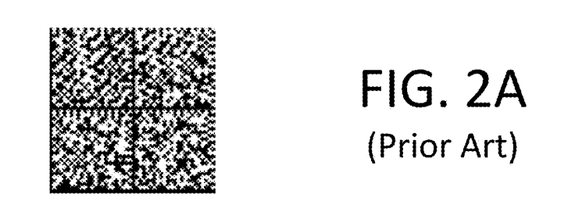
FIGS. 2A-2D illustrates examples of two-dimensional bar codes.
Figure 2B:
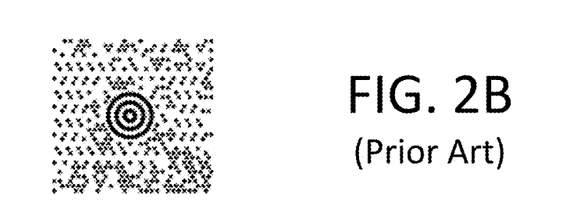
Figure 2C:
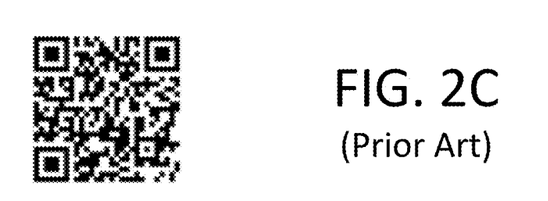
Figure 2D:
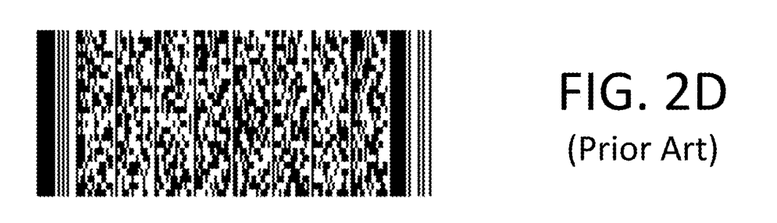

One-dimensional bar codes, such as the well-known Universal Price Code (UPC), encode and store data in a pattern of alternating black and white bars of different widths. See, FIG. 1. A start pattern is embedded at one end of the bar code, and a stop pattern is embedded at the opposite end of the bar code. The start/stop patterns allow the bar code scanner to identify the starting and ending points of the bar code as well as discern the central portion of the bar code containing the encoded data of interest.

The need to store larger amounts of data has led to the creation of two-dimensional bar codes. In one embodiment of a two-dimensional bar code, multiple rows of one-dimensional bar codes are provided. Another embodiment of a two dimensional bar code utilizes a matrix of black and white dots or squares arranged in a pattern. Examples of such a two-dimensional bar code include the well-known QR code and Data Matrix code. See, FIGS. 2A-2D. Indexing indicia are incorporated in the two-dimensional bar code to assist in the determination of code orientation as well as identify start and stop locations of the encoded data.

There are a number of concerns with the use of two-dimensional bar codes. One concern is the difficulty in decoding. Because the decoding operation uses an optical recognition based on a scan line approach, there are increased instances of failure to recognize the bar code due to rotation and perspective adjustments. This is especially a concern in the current market environment where consumers are increasingly using the camera function of their cellular telephones to take images of bar codes.

Another concern is aesthetic presentation. In many applications, the utilitarian appearance of the bar code is of no consequence, such as when used on a hang tag for or on the packaging of goods. However, bar codes are increasingly being used in advertising and other promotional materials (for example, to link to other content such as a website), and in this context the utilitarian appearance of the bar code may be distracting and unattractive. Designers are going to great lengths to graphically integrate the bar code in a more attractive aesthetic presentation within such advertising and promotional materials, but this can be difficult and no matter what integration steps are taken, the utilitarian appearance of the bar code is still present. Indeed, this concern is even more prevalent in situations where the overall image occupies a relatively small area, with the bar code occupying a disproportionate area and thus being even more distracting.

There is a need in the art to provide for a more attractive-looking two-dimensional bar code that is easy to decode.

SUMMARY

In an embodiment, a machine readable code comprises: a central region delimited by a periphery having a closed curved shape; and a plurality of geometric shapes arranged in a sequence along the periphery and surrounding the central region, each geometric shape of said plurality of geometric shapes projecting radially outwardly from said periphery; wherein the plurality of geometric shapes include at least two visually distinct presentations for encoding information based on a pattern of the visually distinct presentations of the plurality of geometric shapes in said sequence.

In an embodiment, a machine readable code comprises: a graphic seal shape including a central region and a plurality of triangular shapes arranged in a sequence surrounding the central region, wherein a vertex of each triangular shape of said plurality of triangular shapes extends radially outwardly from said central region; wherein the plurality of triangular shapes include at least two visually distinct presentations for encoding information based on a pattern of the visually distinct presentations of the plurality of triangular shapes in said sequence.

In an embodiment, a method comprises: encoding information in a graphic figure including a central region and a plurality of graphic shapes arranged in a sequence surrounding the central region, wherein encoding comprises: selecting between at least two visually distinct presentations of the graphic shapes to encode the information in a pattern of the visually distinct presentations of the plurality of graphic shapes in said sequence.

In an embodiment, a device configured to acquire an image of a graphic figure, compensate for perspective distortion of the image and decode data encoded in said graphic figure, wherein said graphic figure comprises: a central region delimited by a periphery having a closed curved shape; and a plurality of geometric shapes arranged in a sequence along the periphery and surrounding the central region, each geometric shape of said plurality of geometric shapes projecting radially outwardly from said periphery; wherein the plurality of geometric shapes include at least two visually distinct presentations for encoding information based on a pattern of the visually distinct presentations of the plurality of geometric shapes in said sequence.

BRIEF DESCRIPTION OF THE DRAWINGS

For a better understanding of the embodiments, reference will now be made by way of example only to the accompanying figures in which.

DETAILED DESCRIPTION OF THE DRAWINGS

Figure 3:
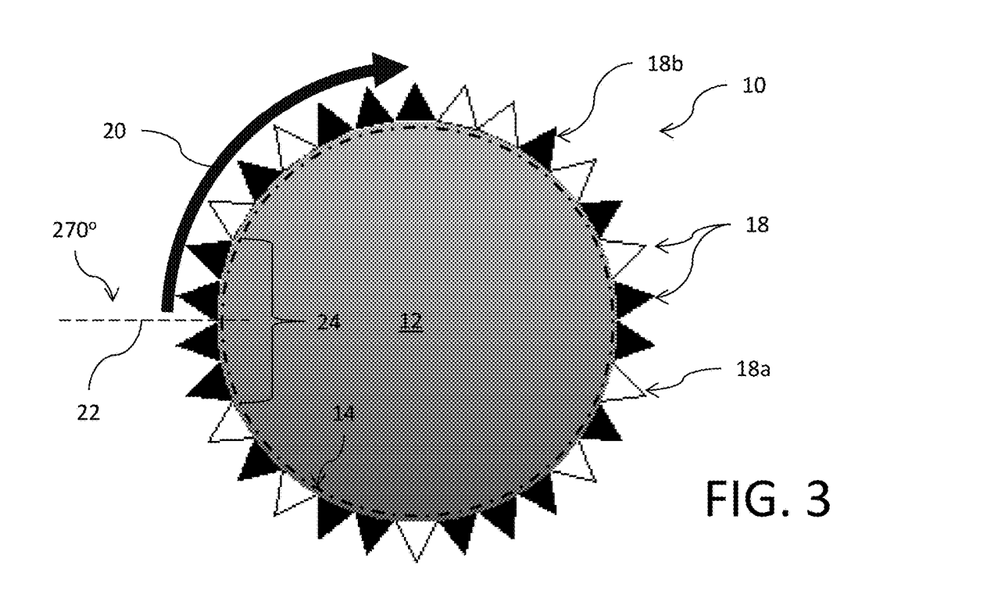
FIGS. 3 and 4 illustrate examples of a star-shaped machine readable code.

Reference is now made to FIG. 3 showing a star-shaped machine readable code 10. The star-shaped machine readable code 10 includes a central region 12 enclosed by an outer periphery 14. The outer periphery 14 may, for example, be defined by a closed curved peripheral line, shape or other distinguishing graphic feature (such as an edge, or a color change, etc.) which delimits and encloses the central region 12. In a preferred embodiment, the central region 12 and outer periphery 14 has a circular geometric shape, although this is not necessarily a limitation. The data is encoded and stored in a pattern of geometric shapes 18 which are arranged in a sequence extending along the outer periphery 14 and surrounding the central region 12. In an embodiment, the geometric shapes may have a shape that radially extends outwardly from the outer periphery 14. In the illustrated example, the geometric shapes 18 are in the form of triangular shaped structures having a base at the outer periphery and an opposite vertex that extends radially from the outer periphery. The triangular shape may, for example, comprise an equilateral triangle or an isosceles triangle. The geometric shapes 18 are provided in at least two visually distinct presentations 18a and 18b. In this context, "visually distinct" means recognizable as different in an image that has been taken of the star-shaped machine readable code 10. Here, the geometric shapes 18 are of the same size, but have two different colors to provide visual distinctiveness. More specifically, same size geometric shapes each have a shape outline and the two different colors comprise two different fill colors within the outline. Alternatively, the geometric shapes 18 may be of the same color, but have two different sizes to provide visual distinctiveness. More specifically, different size geometric shapes each have a shape outline of different size but with a same fill color within the outline. Although two distinct visual presentations 18a and 18b are shown, it will be understood that the encoding of data may implicate more than two visually distinct presentations 18a and 18b and such an implementation may be used to increase the amount of data encoded and stored by the star-shaped machine readable code 10. In the implementation shown in FIG. 3, a color of the shape outline and a color of the fill within the outline for the visual presentation 18a are different, while a color of the shape outline and a color of the fill within the outline for the visual presentation 18b are the same. Furthermore, with respect to each of the at least two visually distinct presentations 18a and 18b, the color for at least one of the outlines and fills is different from a background color on which the star-shaped machine readable code 10 is presented. This is important to ensure that a geometric shape 18 is provided at each possible radial position in the sequence around the periphery 14. Data may be encoded by the presence or absence of a marking, or more particularly by the presence of markings having distinct visual presentations. For example, a color of the central region 12 may match one or more of the colors used for the outline and fill of at least one of the at least two visually distinct presentations 18a and 18b. Alternatively, different colors or shadings may be used for the at least two visually distinct presentations 18a and 18b.

The star-shaped machine readable code 10 is read by following a path 20 around the perimeter of the code to detect the visually distinct presentations of the geometric shapes 18 radially extending outwardly from the outer periphery 14. In an embodiment, an index position 22 that is used to define the start and stop of the code is predefined to be located at a certain radial angle relative to a reference angle. In this example, the reference angle of 0° is at the top of the star-shaped machine readable code 10 and the index position 22 is at a selected radial angle of 270°. In another embodiment, the index position 22 that is used to define the start and stop of the code is predefined to be located at a certain cardinal direction relative to the center of the central region 12. In this example, the cardinal direction is "West". In yet another embodiment, a distinct set 24 of geometric shapes 18 provides the index position 22 that is used to define the start and stop of the code. In this example, the distinct set 24 comprises four consecutive geometric shapes 18 of the same visual presentation (such as, for example, four consecutive geometric shapes 18 having the visual presentation 18b), and the index position 22 is located at the center of the four consecutive geometric shapes 18. To support this implementation, the data encoding scheme must be controlled to preclude producing the distinct set 24 except at the location of the index position 22. Considering any of the foregoing examples, the read code following path 20 from the index position 22 presents a code of <1101011100 . . . 011>, where the visual presentation 18a is logic "0" and the visual presentation 18b is logic "1".

Figure 4:
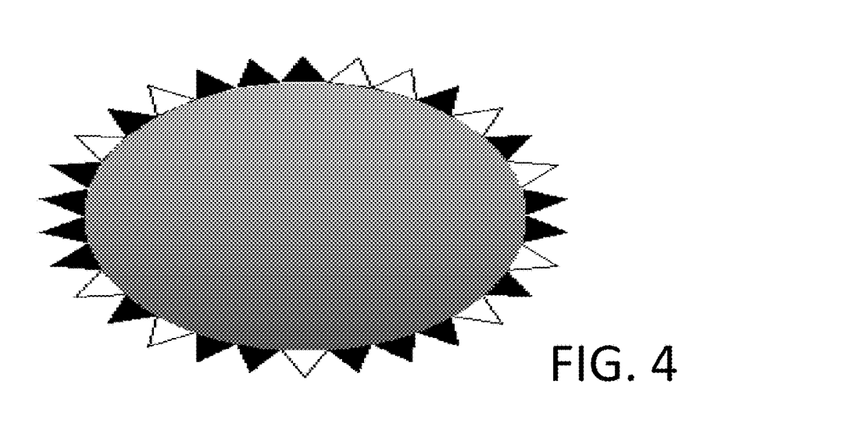

Although a circular geometric shape is shown in FIG. 3, it will be understood that the geometric shape may comprise any selected closed curvilinear shape including, for example, an oval or elliptical shape as shown in FIG. 4. It will further be noted that an image of the circular geometric shape shown in FIG. 3 that is taken off the perpendicular axis will present with a reasonable or acceptable approximation as an elliptical shape like that shown in FIG. 4. There is no different computational effort required to trace a circular path or an elliptical path, once the location and the size of two axis of and elliptic shape are known. Therefore the perspective distortion, which can be quickly estimated for circular objects, does not imply any significant additional complexity in the decoding process. See, FIG. 11 and discussion below.

Figure 5:
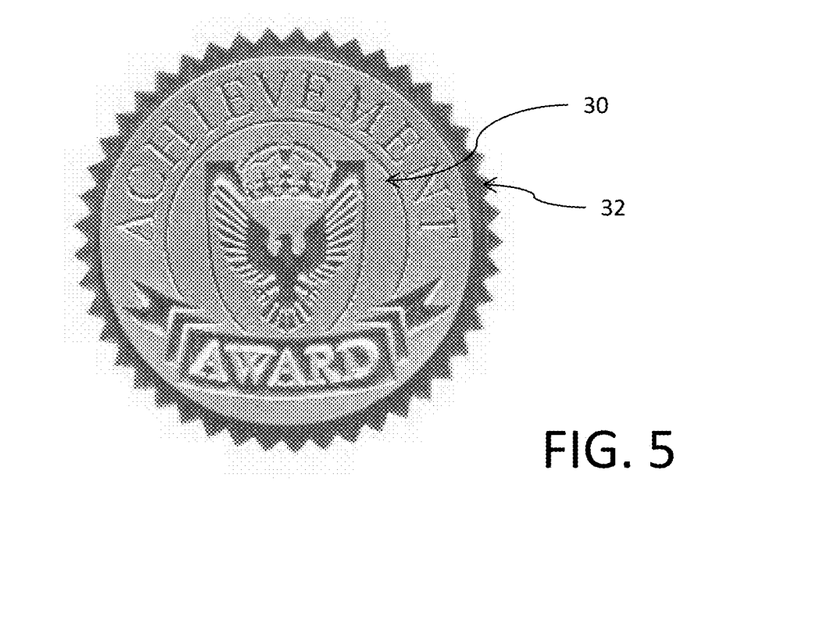
FIG. 5 shows a seal which can utilize the star-shaped machine readable code of FIG. 3.

From an aesthetic perspective, the star-shaped machine readable code 10 may be visually implemented in the form of a graphic seal (or emblem) like that shown in FIG. 5. In such an implementation, the shape provided by the combination of the central region 12 and the geometric shapes 18 mimics the shape of the graphic seal of the system commonly used to authenticate an official document (such as diploma of governmental document) or indicate the awarding of a prize or unique recommendation (for example, a seal of approval or certification). The graphic design 30 of the seal may be implemented within the central region 12 delimited by the outer periphery 14, and the peripheral points 32 of the seal design may be implemented with visually distinct presentations 18a, 18b, etc. so as to encode the data. Such a design may be graphically integrated into an advertisement more attractively manner than prior art bar codes of the type shown in FIGS. 1 and 2A-2D. For example, if a product won an award, the representation of the award in the form, for example, of a seal like that shown in FIG. 5 could be visually presented in the advertisement with the peripheral points 32 of the seal encoding the bar code data related to the product as shown in FIG. 3. This would be substantially more aesthetically pleasing in the advertisement than inclusion of a bar code of the type shown in FIGS. 1 and 2A-2D.

Figure 6:
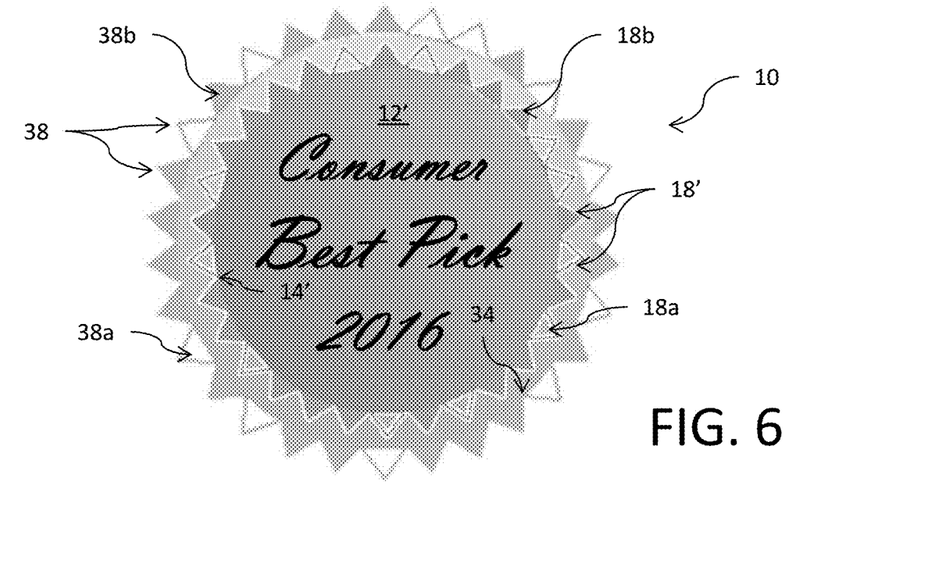
FIG. 6 shows a multiple order configuration of the star-shaped machine readable code.

To increase the amount of data that can be encoded into the star-shaped machine readable code 10, multiple orders (or levels) of the coding features may be used. An example, of such a multiple order configuration is shown in FIG. 6. The star-shaped machine readable code 10 includes a central region 12' enclosed by a first outer periphery 14'. The first outer periphery 14' may, for example, be defined by a closed peripheral line or other distinguishing graphic feature (such as an edge, or a color change, etc.) which delimits and encloses the central region 12'. A first order (or level) of the data is encoded and stored in a pattern of geometric shapes 18' which radially extend outwardly from the first outer periphery 14'. In the illustrated example, the geometric shapes 18' are in the form of triangular shaped structures. The geometric shapes 18' are provided in at least two visually distinct presentations 18a and 18b. A second outer periphery 34 is defined at the outer extent of the geometric shapes 18'. The second outer periphery 34 may, for example, be defined by a closed peripheral line or other distinguishing graphic feature (such as an edge, or a color change, etc.) which delimits and encloses the first order of the data. A second order (or level) of the data is encoded and stored in a pattern of geometric shapes 38 which radially extend outwardly from the second outer periphery 34. In the illustrated example, the geometric shapes 38 are in the form of triangular shaped structures. The geometric shapes 38 are provided in at least two visually distinct presentations 38a and 38b.

In an embodiment as shown in FIG. 6 the size of the geometric shapes 38 is smaller than the size of the geometric shapes 18'. As an alternative, the sizes of the geometric shapes 18' and 38 may be identical.

In an embodiment as shown in FIG. 6, the particular triangular shapes (for example, equilateral) of the geometric shapes 18' and 38 may be identical. As an alternative, the geometric shapes 18' and 38 may utilize different triangular shapes (for example, one equilateral and the other isosceles, or both isosceles but with different base size) or even shapes different from the triangular one: such as, for example, dots, squares, hearts, deck card symbols, stars, flowers, etc. Said more elaborate forms could require additional shape recognition.

Figure 7:
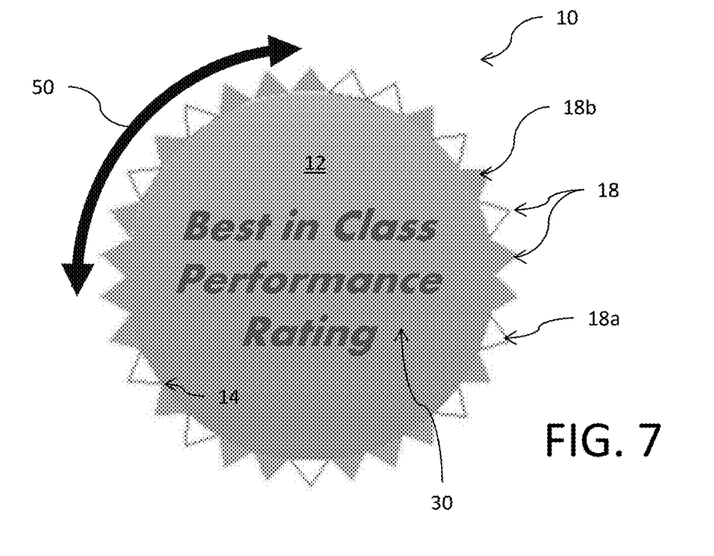
FIGS. 7 and 8A-8C show animation of the star-shaped machine readable code.
Figure 8A:
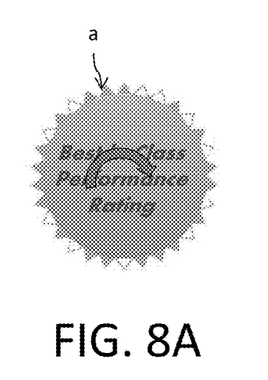
Figure 8B:
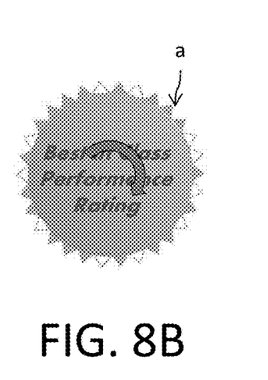
Figure 8C:
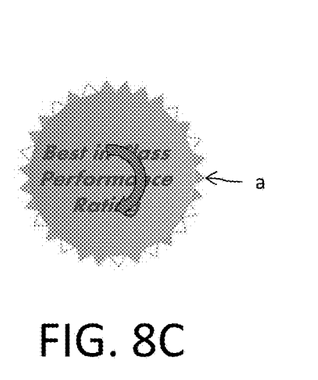

Reference is now made to FIG. 7. The use of a round or other curved shape for the central region 12 supports an animation feature of the star-shaped machine readable code 10. In this animation feature, the central region 12, including any graphic design 30, may remain fixed in position. However, the pattern of geometric shapes 18 which radially extend outwardly from the outer periphery 14 rotate, either clockwise or counter-clockwise, along the outer periphery 14 in the manner shown by arrow 50 and illustrated in the sequence of FIGS. 8A-8C (with a clockwise rotation, see movement of the shape 18 identified by reference "a"). Such an animated presentation of the star-shaped machine readable code 10 may be made on any suitable video display (including, for example, a television screen, movie screen, cellular phone display, advertising display, etc.). In an alternative implementation, the graphic design 30 may rotate with the rotation of the pattern of geometric shapes 18. Because the full extent of the patterns of geometric shapes 18 are visible, a snap-shot image of the star-shaped machine readable code 10 may be taken with respect to any instantaneous rotation position for purposes of processing and decoding the data.

With respect to the implementation of the multiple order configuration of FIG. 6, animation may be provided for either or both of the patterns of geometric shapes 18 and 38, with such rotations occurring either in the same direction or in opposite directions. Because the full extent of the patterns of geometric shapes 18 and 38 are visible, a snap-shot image of the star-shaped machine readable code 10 may be taken with respect to any instantaneous rotation position for purposes of processing and decoding the data. Other animations schemes such as pulsating or color/shade changing will not affect decoding, as a single snapshot will exhibit consistent graphic features.

Figure 9:
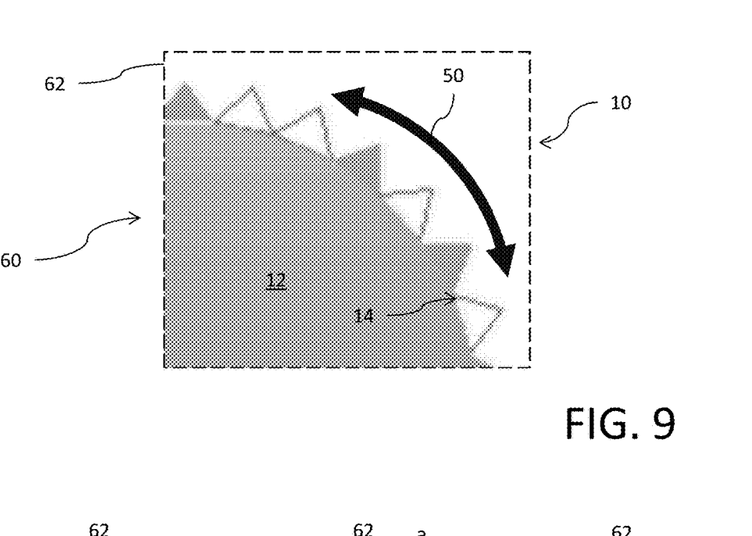
FIGS. 9 and 10A-10C show animation with partial presentation of the star-shaped machine readable code.
Figure 10A:
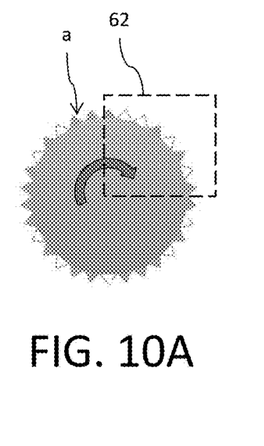
Figure 10B:
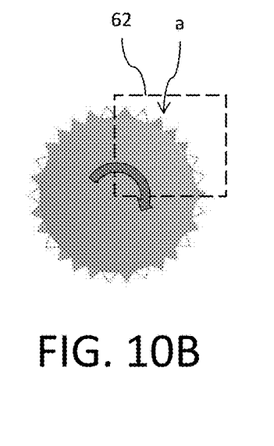
Figure 10C:
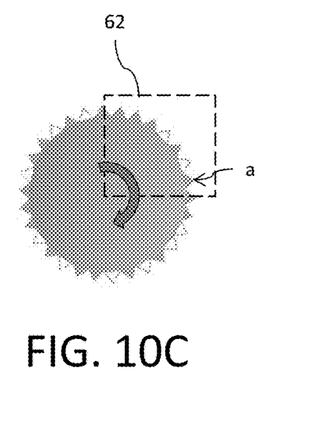

Reference is now made to FIG. 9. Here, only a portion 60 of the star-shaped machine readable code 10 is displayed. The portion that is displayed is defined within a display window 62. Here, because only a small fraction of patterns of geometric shapes 18 and/or 38 are visible at any given time, the animation feature described above is especially useful. Again, the central region 12, including any graphic design, may remain fixed in position. However, the pattern of geometric shapes 18 which radially extend outwardly from the outer periphery 14 rotate, either clockwise or counter-clockwise, along the outer periphery 14 in the manner shown by arrow 50 and illustrated in the sequence of FIGS. 10A-10C (with a clockwise rotation, see movement of the shape 18 identified by reference "a"). Because the full extent of the patterns of geometric shapes 18 and/or 38 in not visible at any one time, a video image of the rotating star-shaped machine readable code 10 is taken over a given time period for purposes of processing and decoding the data. An advantage of the FIG. 9 implementation is that the display window 62 can take up less space in an overall image presentation (such as in an advertisement), thus leaving room in the overall image presentation for the display of other information. The coded information presentation is also less distracting than with prior art bar coded designs.

Another advantage of the FIG. 9 implementation is that the amount of graphic shapes which can be displayed during the animation may exceed the 360° limit which it would have if the star-shaped machine readable code were shown statically in its entirety. This is made possible because, after a first full rotation, the next graphical shapes 18 to be shown can be different from the ones shown at the beginning of the animation. Because the first quarter and the fourth quarter are never shown at the same time, showing a "fifth" quarter after the fourth quarter would exhibit no discontinuity to the viewer. Say we have a pattern such as 12345|67890|ABCDE|FGHIJ|KLMNO| . . . , where each alphanumeric character represent a shape 18, each occupying 18 degrees (18°×5=90°, full round 360°=20×18°). A static star-shaped machine readable code would be composed of twenty shapes 18. With the partially visible animated implementation, the display would initially show 12345, then 23456, then 34567 and, when the 360° are completed, FGHIJ relating to a first sequence. When a new round starts, a pattern representing a second sequence (different from the first sequence starting with 12345) gradually enters in the screen, resulting in the following sequence GHIJK, then HIJKL and so on. The advantage is to increase the capacity of the presentation, without compromising with readability by reducing the size of the shape to let them fit in the 360° limit.

Figure 11:
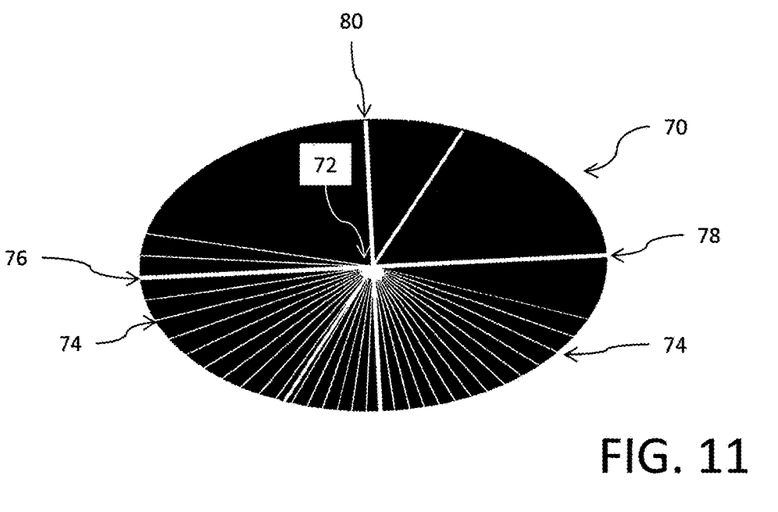
FIG. 11 shows a processing technique for determining the positioning and orientation of an elliptical shape.

Proper detection of the patterns of geometric shapes 18 and/or 38 requires determining the positioning and orientation of the star-shaped machine readable code 10. In many instances, the image taken of the star-shaped machine readable code 10 will be elliptical even though the star-shaped machine readable code 10 has a circular central region 12 (see, FIG. 4 and the discussion above). The following process is implemented to determine position and orientation: a) central region 12 is detected in the bitmap for the image of the star-shaped machine readable code 10; b) The center point of the central region 12 is determined; c) radiuses from the center point to the periphery 14 are measured; d) either the shortest or longest measured radius is selected as corresponding to the minor or major axis of the elliptical shape of the central region 12; and e) a 90° angular offset is applied to obtain the other one of the minor or major axis. This process is illustrated in FIG. 11 with reference 70 identifying the elliptically shaped central region, reference 72 identifying the center point, references 74 identifying the measured radii, reference 76 identifying the longest measured radius, reference 78 identifying the corresponding major axis and reference 80 identifying the minor axis.

The process can be implemented using a relatively simple processing algorithm that advantageously does not rely on orientation. So, for example, this presents an advantage over the processing algorithm typically used with respect to prior art QR type bar codes which is dependent on bar code orientation and may need to be executed up to four times at four different image rotations before a detection is made.

A system or device may be used to acquire an image of a graphic figure. The system/device then implements a compensation process addressing perspective distortion of the image as discussed in connection with FIG. 11. The system/device then decodes data encoded in said graphic figure. Such a system or device may be implemented using any suitable imaging device (such as a camera or other imager) and a processing circuit (such as a microprocessor or computer) that is coupled to the imager. For example, the imaging device may be a camera of a cellular telephone device and the processing circuit may comprise a microprocessor or image processor of the cellular telephone device. As another example, the imaging device may be a camera of a bar code reader/scanner device and the processing circuit may comprise a microprocessor or image processor of the bar code reader/scanner device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

What is claimed is:

1. A machine readable code, comprising:
   a central region delimited by a periphery having a closed curved shape; and
   a plurality of geometric shapes arranged in a sequence along the periphery and surrounding the central region, each geometric shape of said plurality of geometric shapes projecting radially outwardly from said periphery, wherein each geometric shape of said plurality of geometric shapes comprises a triangular shape;
   wherein the plurality of geometric shapes include at least two visually distinct presentations for encoding information based on a pattern of the visually distinct presentations of the plurality of geometric shapes in said sequence.

2. The machine readable code of claim 1, further comprising a graphic design overlying the central region.

3. The machine readable code of claim 1, wherein the closed curved shape is one of a circular shape or elliptical shape.

4. The machine readable code of claim 1, wherein the at least two visually distinct presentations comprises triangular shapes of a same size which have an outline and at least two different fill colors within the outline.

5. The machine readable code of claim 1, wherein a base of each triangular shape is located at said periphery and an opposite vertex thereto extends radially outwardly from the periphery.

6. The machine readable code of claim 1, wherein said periphery is an outer periphery, further including:
   an inner periphery also having said closed curved shape but smaller than the outer periphery; and
   a further plurality of geometric shapes arranged in a further sequence along the inner periphery and surrounding the central region, each geometric shape of said further plurality of geometric shapes projecting radially outwardly from said inner periphery;
   wherein the further plurality of geometric shapes include at least two visually distinct presentations for encoding information based on a pattern of the visually distinct presentations of the further plurality of geometric shapes in said further sequence.

7. The machine readable code of claim 6, wherein each geometric shape of said further plurality of geometric shapes comprises a triangular shape.

8. The machine readable code of claim 7, wherein the at least two visually distinct presentations comprises triangular shapes of a same size which have an outline and at least two different fill colors within the outline.

9. The machine readable code of claim 7, wherein a base of each triangular shape is located at said inner or outer periphery and an opposite vertex thereto extends radially outwardly from the inner or outer periphery.

10. The machine readable code of claim 6, further comprising an animation in which at least one of the sequence and further sequence of the geometric shapes rotationally moves around the central region.

11. The machine readable code of claim 10, wherein the rotational movement is one of clockwise or counter-clockwise.

12. A machine readable code, comprising:
   a central region delimited by a periphery having a closed curved shape; and
   a plurality of geometric shapes arranged in a sequence along the periphery and surrounding the central region, each geometric shape of said plurality of geometric shapes projecting radially outwardly from said periphery;
   wherein the plurality of geometric shapes include at least two visually distinct presentations for encoding information based on a pattern of the visually distinct presentations of the plurality of geometric shapes in said sequence; and
   an animation in which the sequence of the geometric shapes rotationally moves around the central region.

13. The machine readable code of claim 12, wherein the rotational movement is one of clockwise or counter-clockwise.

14. The machine readable code of claim 12, further comprising a window which permits viewing of only a fraction of the central region and corresponding geometric shapes along the periphery of said fraction.

15. The machine readable code of claim 14, wherein the rotation movement rotationally moves the sequence through the window over a time period.

16. The machine readable code of claim 15, wherein the sequence comprises a first sequence occupying a 360° path around the central region and a second sequence occupying a 360° path around the central region, and wherein the rotational movement rotationally moves the first sequence through the window and then rotationally moves the second sequence through the window.

17. The machine readable code of claim 12, further comprising a graphic design overlying the central region.

18. The machine readable code of claim 12, wherein the closed curved shape is one of a circular shape or elliptical shape.

19. The machine readable code of claim 12, wherein each geometric shape of said plurality of geometric shapes comprises a triangular shape.

20. The machine readable code of claim 19, wherein the at least two visually distinct presentations comprises triangular shapes of a same size which have an outline and at least two different fill colors within the outline.

21. The machine readable code of claim 19, wherein a base of each triangular shape is located at said periphery and an opposite vertex thereto extends radially outwardly from the periphery.

22. A machine readable code, comprising:
a central region delimited by a periphery having a closed curved shape; and
a plurality of geometric shapes arranged in a sequence along the periphery and surrounding the central region, each geometric shape of said plurality of geometric shapes projecting radially outwardly from said periphery;
wherein the plurality of geometric shapes include at least two visually distinct presentations for encoding information based on a pattern of the visually distinct presentations of the plurality of geometric shapes in the sequence; and
an animation in which the plurality of geometric shapes in the sequence change color.

23. The machine readable code of claim 22, further comprising a graphic design overlying the central region.

24. The machine readable code of claim 22, wherein the closed curved shape is one of a circular shape or elliptical shape.

25. The machine readable code of claim 22, wherein each geometric shape of said plurality of geometric shapes comprises a triangular shape.

26. The machine readable code of claim 25, wherein the at least two visually distinct presentations comprises triangular shapes of a same size which have an outline and at least two different fill colors within the outline.

27. The machine readable code of claim 25, wherein a base of each triangular shape is located at said periphery and an opposite vertex thereto extends radially outwardly from the periphery.

28. A machine readable code, comprising:
a central region delimited by a periphery having a closed curved shape; and
a plurality of geometric shapes arranged in a sequence along the periphery and surrounding the central region, each geometric shape of said plurality of geometric shapes projecting radially outwardly from said periphery;
wherein the plurality of geometric shapes include at least two visually distinct presentations for encoding information based on a pattern of the visually distinct presentations of the plurality of geometric shapes in the sequence; and
an animation in which the plurality of geometric shapes in the sequence pulsate.

29. The machine readable code of claim 28, further comprising a graphic design overlying the central region.

30. The machine readable code of claim 28, wherein the closed curved shape is one of a circular shape or elliptical shape.

31. The machine readable code of claim 28, wherein each geometric shape of said plurality of geometric shapes comprises a triangular shape.

32. The machine readable code of claim 31, wherein the at least two visually distinct presentations comprises triangular shapes of a same size which have an outline and at least two different fill colors within the outline.

33. The machine readable code of claim 31, wherein a base of each triangular shape is located at said periphery and an opposite vertex thereto extends radially outwardly from the periphery.

34. A machine readable code, comprising:
a central region delimited by a periphery having a closed curved shape; and
a plurality of geometric shapes arranged in a sequence along the periphery and surrounding the central region, each geometric shape of said plurality of geometric shapes projecting radially outwardly from said periphery;
wherein the plurality of geometric shapes include at least two visually distinct presentations for encoding information based on a pattern of the visually distinct presentations of the plurality of geometric shapes in the sequence; and
wherein a combination of the central region and plurality of geometric shapes mimics the shape of a graphic seal.

35. The machine readable code of claim 34, further comprising a graphic design overlying the central region.

36. The machine readable code of claim 34, wherein the closed curved shape is one of a circular shape or elliptical shape.

37. The machine readable code of claim 34, wherein each geometric shape of said plurality of geometric shapes comprises a triangular shape.

38. The machine readable code of claim 37, wherein the at least two visually distinct presentations comprises triangular shapes of a same size which have an outline and at least two different fill colors within the outline.

39. The machine readable code of claim 37, wherein a base of each triangular shape is located at said periphery and an opposite vertex thereto extends radially outwardly from the periphery.

40. A machine readable code, comprising:
a graphic seal shape including a central region and a plurality of triangular shapes arranged in a sequence surrounding the central region, wherein a vertex of each triangular shape of said plurality of triangular shapes extends radially outwardly from said central region;
wherein the plurality of triangular shapes include at least two visually distinct presentations for encoding information based on a pattern of the visually distinct presentations of the plurality of triangular shapes in said sequence.

41. The machine readable code of claim 40, wherein the triangular shapes have an outline and the at least two visually distinct presentations comprise at least two different fill colors within the outline.

42. The machine readable code of claim 40, further comprising an animation in which the sequence of the triangular shapes rotationally moves around the central region.

43. The machine readable code of claim 42, further comprising a window which permits viewing of only a fraction of the central region and corresponding triangular shapes along the periphery of said fraction.

44. The machine readable code of claim 42, wherein the rotation movement rotationally moves the sequence through the window over a time period.

45. The machine readable code of claim 40, further comprising a graphic design overlying the central region.

46. A method, comprising:
encoding information in a graphic figure including a central region and a plurality of graphic shapes arranged in a sequence surrounding the central region, wherein encoding comprises:
selecting between at least two visually distinct presentations of the graphic shapes to encode the information in a pattern of the visually distinct presentations of the plurality of graphic shapes in said sequence; and
animating the graphic figure by rotationally moving the sequence around the central region.

47. The method of claim 46, wherein the graphic shapes comprise triangular shapes and wherein a vertex of each triangular shape of said triangular shapes extends radially outwardly from said central region.

48. The method of claim 46, further comprising reading said pattern of the visually distinct presentations of the plurality of graphic shapes in said sequence to recover the encoded information.

49. The method of claim 46, further comprising:
defining a window which permits viewing of only a fraction of the central region and corresponding graphic shapes along said fraction; and
animating the graphic figure by rotationally moving the sequence around the central region so that the graphic shapes of said sequence rotationally move through the window over a time period.

50. The method of claim 46, further comprising:
taking an image of the graphic figure;
identifying the central region within the image;
determining a center point of the central region;
measuring radiuses from the center point to a periphery of the central region at a plurality of angles;
identifying one of a shortest or a longest measured radius as corresponding to a minor or major axis, respectively of an elliptical shape;
applying a 90° angular offset to obtain the other one of the minor or major axis.

* * * * *